(No Model.)

M. DILLENBURG.
PIPE COUPLING.

No. 323,567. Patented Aug. 4, 1885.

Witnesses:
Geo. H. Strong.
J. H. Rourke.

Inventor,
M. Dillenburg
By
Dewey & Co.
Attorneys

United States Patent Office.

MICHAEL DILLENBURG, OF SAN FRANCISCO, CALIFORNIA.

PIPE-COUPLING.

SPECIFICATION forming part of Letters Patent No. 323,567, dated August 4, 1885.

Application filed June 3, 1885. (No model.)

*To all whom it may concern:*

Be it known that I, MICHAEL DILLENBURG, of the city and county of San Francisco, State of California, have invented an Improvement in Pipe-Couplings; and I hereby declare the following to be a full, clear, and exact description of the same.

My invention relates to the class of couplings for pipes; and it consists of a split sleeve fitting on the pipe, and having a conical or wedge-shaped exterior surface, a head having a correspondingly-shaped aperture, in which the sleeve is seated, a tubular connecting sleeve or link fitting upon the end of the pipe and seated within the inner portion of the aperture of the head, which is made with a plane surface to receive it, a washer between the tubular connecting-sleeve and the split sleeve, and tie-bolts connecting the two heads, all of which I shall hereinafter fully explain by reference to the accompanying drawings, in which—

Figure 1:
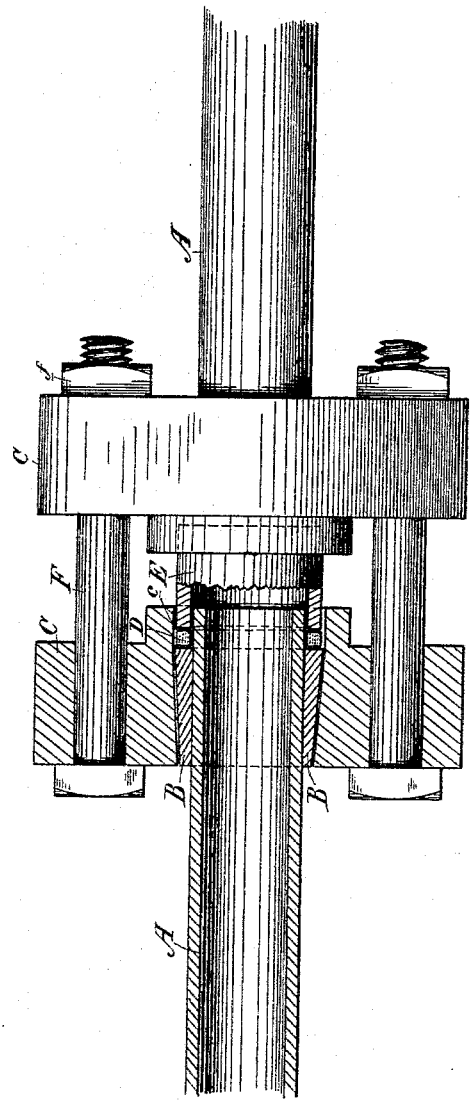
Figure 2:
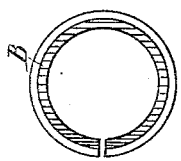

Figure 1 is a view of my coupling, one half being shown in section and the other half in elevation. Fig. 2 is a front view of the split sleeve.

The object of my invention is to provide a simple and effective pipe-coupling without having to resort to threading the pipes. The coupling is a two-part one, the parts on one side being the counterpart of those on the other. I shall, therefore, for the sake of clearness, use the singular number in describing them.

A is the pipe. B is the split sleeve, having its exterior surface of a wedge or conical shape. The sleeve is fitted on the pipe, with its base or portion of largest diameter adjacent to the end to be coupled, though removed therefrom a short distance.

C is the head. It consists of a casting or other piece having a central aperture, *c*. The inner portion of the aperture has a perfectly plane or parallel surface, whence said aperture continues in a conical shape, corresponding to the shape of the split sleeve B, which is seated therein.

Around the end of the pipe and against the inner end of the sleeve is a washer, D.

E is the tubular sleeve or connecting-link, consisting of a short section of pipe. It is seated within the plane or parallel portion of the aperture of the head, and encircles the end of the pipe and bears against the washer.

F are the tie-bolts between the two heads, and *f* are the nuts by which the bolts are set up.

The operation of the device is as follows: By tightening up the bolts the heads are drawn together, which, acting on the connecting-sleeve E, causes said sleeve to force the split sleeves apart. These, being confined in the conical aperture of the heads, bind the tighter upon the pipes and hold them. The washers prevent any leak.

This device is applicable to the coupling of a pipe onto an elbow as well as to another pipe.

Having thus described my invention, what I claim as new, and desire to secure by Letters Patent, is—

1. In a pipe-coupling, the combination of the split sleeve B, fitted on the pipe, and having a conical or wedge-shaped exterior surface, the head C, having a correspondingly-shaped aperture, in which the sleeve is seated, the tie-bolts F, for setting up the head, and the tubular connecting-sleeve E, seated in the head and upon the inner end of the pipe, substantially as herein described.

2. In a pipe-coupling, the combination of the split sleeve B, fitted on the pipe, and having a conical or wedge-shaped exterior surface, the head C, having a correspondingly-shaped aperture, in which the sleeve is seated, the tubular connecting-sleeve E, seated in the head on the inner end of the pipe, and the washer D between the connecting-sleeve and the split sleeve, substantially as herein described.

3. In a pipe-coupling, the split sleeve B, fitted on the pipe, and having a conical or wedge-shaped exterior surface, and the tubular connecting-sleeve E, fitted on the inner end of the pipe, in combination with the head C, having an aperture, one portion of which has a conical shape for seating the split sleeve, and the other portion has a plane or parallel surface for seating the connecting-sleeve, substantially as herein described.

4. A pipe-coupling comprising the split sleeve B, fitted on the pipes, and having a conical or wedge-shaped exterior surface, the heads C, having conical-shaped apertures, in which the sleeves are seated, the tubular connecting-sleeve E, seated in the inner portion of the aperture of the heads on the ends of the pipes, the washers D between the connecting-sleeve and the split sleeve, and the bolts F and nuts $f$, by which the heads are forced together, substantially as herein described.

In witness whereof I have hereunto set my hand.

MICHAEL DILLENBURG.

Witnesses:
S. H. NOURSE,
DANIEL CLARK.